United States Patent [19]
Halstead et al.

[11] Patent Number: 5,180,098
[45] Date of Patent: Jan. 19, 1993

[54] AIR CONDITIONER CONDENSER ASSEMBLY

[75] Inventors: Gary A. Halstead; Brian L. Barten; Terence Trentacoste, all of Lockport, N.Y.

[73] Assignee: General Motors Corporation, Detroit, Mich.

[21] Appl. No.: 856,275

[22] Filed: Mar. 23, 1992

[51] Int. Cl.⁵ .................. B23K 1/19; B23K 35/363
[52] U.S. Cl. ...................................... 228/183; 228/223
[58] Field of Search ............... 228/183, 207, 223, 254, 228/263.17; 29/890.03, 890.035

[56] References Cited

U.S. PATENT DOCUMENTS

| | | | |
|---|---|---|---|
| 3,951,328 | 4/1976 | Wallace et al. | 228/207 |
| 3,971,501 | 7/1976 | Cooke | 228/248 |
| 4,645,119 | 2/1987 | Haramaki et al. | 228/183 |
| 4,781,320 | 11/1988 | Fujiyoshi | 228/183 |
| 4,906,307 | 3/1990 | Fujiyoshi | 228/223 |

FOREIGN PATENT DOCUMENTS 2391803  1/1979  France .................. 228/223

OTHER PUBLICATIONS

Alloy 3003 Elemental Composition taken from "Registration Record of Aluminum Association Designations and Chemical Composition Limits for Wrought Aluminum and Wrought Aluminum Alloys", the Aluminum Association, Inc., Washington, D.C.

*Primary Examiner*—Samuel M. Heinrich
*Attorney, Agent, or Firm*—George A. Grove; Domenica N. S. Hartman

[57] ABSTRACT

An improved method for assembly of a brazed condenser unit for use in an automobile air conditioning system is provided which significantly reduced the defective rate due to leaky internal joints within the condenser. A sufficiently viscous flux composition is applied to the internal features of the condenser during assembly. The flux composition is specifically applied to surfaces of the aluminum alloy header which is clad internally with the brazing alloy, so as to promote complete and consistent brazing of the internal tubes and components. The brazing flux composition of this invention consists of potassium fluoaluminate particles in a liquid carrier consisting of a polyhydric alcohol, e.g., propylene glycol, and minimal amounts of water. This flux composition has a sufficiently high viscosity so as to permit its easy, consistent deposition on the header surface without subsequent displacement during assembly and processing.

7 Claims, 2 Drawing Sheets

AIR CONDITIONER CONDENSER ASSEMBLY

The present invention relates to an improvement in the method for assembly of tube-and-center type condensers for use within an automotive air conditioning system. More particularly, this invention relates to improved brazing techniques for formation of the internal joints within such a condenser wherein a highly concentrated flux paste is deposited during assembly onto a stamped header formed from an aluminum alloy brazing stock material which has been clad with a brazing alloy on both surfaces.

BACKGROUND OF THE INVENTION

Air conditioning systems are routinely employed within automobiles and other vehicles for creating comfortable conditions within the passenger compartment for the vehicle occupants. At outside temperatures above about 70° F., it is difficult to maintain a comfortable passenger compartment temperature without first cooling the air that is being blown into the passenger compartment.

Typically, cooling of the air is accomplished by first compressing an appropriate refrigerant, such as the fluorocarbon known as freon or another alternative refrigerant. Within an automobile, the engine-driven compressor compresses the vaporized refrigerant, thereby significantly raising the temperature of the refrigerant. The refrigerant then flows into a condenser where it is cooled and returned to its liquid state; thus, the heat added to the refrigerant in the compressor is transferred out of the system by means of the condenser. The cooled liquid refrigerant is then sprayed through an expansion valve into an evaporator where it is again vaporized. The required heat of vaporization is drawn from the incoming air. Any excess humidity contained within the incoming air is removed as condensation on the evaporator, therefore also drying the incoming air. The cooled, dry air then enters the passenger compartment of the vehicle.

So as to efficiently maximize the amount of surface area available for transferring heat out of the refrigerant in the condenser by the incoming air, the design of the condenser unit is typically a tube-and-center type heat exchanger containing a multitude of tubes interspaced by high surface area fins centered between the tubes. The evaporator unit is often formed of a similar tube-and-center type design.

Conventionally, the condenser has been constructed by inserting the tubes within oppositely disposed headers and then centering the fins between the tubes. Inlet and outlet means fluidically attached to one or more refrigerant reservoirs and in fluidic communication with the tubes are also assembled to the tube and header assembly. The entire assembly is then brazed together.

A problem arises in that the condenser contains a multitude of internal tubes which all must be brazed to the headers during a single brazing operation. There are practically scores of these brazements which must be formed concurrently. Generally, this is accomplished by employing an aluminum alloy brazing stock material for formation of the matched headers. The aluminum alloy brazing stock material consists, for example, of an appropriate aluminum alloy core which has been clad on at least one side with an aluminum-based brazing alloy. Generally, the braze alloy has been provided only on the external side of the stamped component, i.e., the side opposite to the side in which the internal tubes were inserted. Typically, the cladding layers are an aluminum-silicon eutectic brazing alloy characterized by a melting point lower than the core aluminum alloy. Therefore, the clad layers of brazing alloy melt during the brazing operation and flow toward the desired joint regions and upon cooling solidify to form the brazements. The core aluminum alloy does not melt during the brazing operation. The aluminum alloy brazing stock material which has been routinely used to form these types of condensers consists of an aluminum alloy core layer that has been clad on at least one side by an aluminum-silicon brazing alloy.

Prior to brazing, the assembly is generally sprayed with or dipped into a flux mixture to enhance the brazeability of the brazing alloy. A conventional flux mixture consists of about 15 to about 25 volume percent flux solids suspended in water. The assembly is then dried to evaporate the water, leaving only the powdery flux solids on the external surface of the assembly. A satisfactory type of flux for use with these aluminum alloys has been potassium fluoaluminate complexes, as disclosed in U.S. Pat. Nos. 3,951,328 and 3,971,501 to Wallace et al and Cooke, respectively. However, because the flux is only introduced externally to the assembly (through dipping or spraying), the internal joints of the assembly, particularly the tube-to-header joints, do not directly benefit from the application of the flux, as evidenced by the high percentage, sometimes as high as about 10 to 30 percent, of defective leaky assemblies. These assemblies then require costly individual repair.

It would be desirable to provide a means for applying the flux mixture to the internal regions of the condenser so as to enhance the brazeability of the internal joints, particularly the tube-to-header joints. Until now, there has not been a satisfactory method for applying this flux to the internal joints. Generally, the reason for this has been that the flux mixture has been characterized by a sufficiently low viscosity such that the flux mixture is incapable of being consistently deposited at a predetermined region. Also, after evaporation of the aqueous vehicle, the flux is a particulate shape which does not adhere well to the surfaces of the condenser. Subsequent handling and assembly of the condenser would cause sufficient agitation to shake loose a portion of the flux particulates from the condenser surface.

Another shortcoming associated with the use of this conventional brazing approach is that during brazing, it is extremely important that the furnace atmosphere have a dewpoint of about −45° F. or below and a free oxygen level of 100 parts per million (ppm) or less. A common approach has been to employ high purity cryogenic nitrogen. In a high dewpoint or high oxygen-containing atmosphere, a greater amount of oxidation of the aluminum occurs during the brazing cycle, thereby accordingly requiring greater quantities of flux. Therefore, with the conventional approach wherein the flux solids are suspended in water, all of the water must be removed prior to the brazing operation. This is difficult to consistently achieve in a production environment. In addition, entrapped moisture and oxygen inside the internal tanks and tubes of the condenser assembly also impede brazing, thereby requiring complete purging of the assembly just before the brazing operation, which is again costly and difficult to achieve.

Therefore, it would be advantageous to provide a method for brazing these types of condensers, wherein the flux can be pre-applied to specific regions during assembly so as to enhance the brazing of the internal joints, specifically between the tubes and headers. By improving the uniformity and consistency of the internal brazed joints, the number of defective leaky assemblies should be significantly reduced. In addition, it would also be advantageous if the flux of this invention did not require an aqueous-based vehicle, so as to minimize the amount of moisture surrounding the assembly during the brazing operation, thereby optimizing the efficiency of the brazing procedure.

SUMMARY OF THE INVENTION

It is therefore an object of this invention to provide a method for assembly of a brazed condenser unit for use in an automobile air conditioning system.

It is a further object of this invention that such a method for assembly employ a novel, high viscosity flux composition wherein the flux solids are suspended within a solvent which minimizes, or alternatively eliminates, the water content.

It is yet another object of this invention that such a flux composition be deposited onto the desired surfaces of the condenser during assembly, so as to facilitate the brazing of internal joints within the condenser, thereby promoting complete and consistent brazing of the internal tubes to the headers.

It is still a further object of this invention that such a method for assembly of a condenser unit improve the integrity of the internal joints between the tubes and headers so as to minimize the number of defective assemblies due to leaky internal joints.

In accordance with a preferred embodiment of this invention, these and other objects and advantages are accomplished as follows.

According to the present invention, there is provided an improved method for assembly of a brazed condenser unit for use in an automobile air conditioning system which utilizes a novel, high viscosity flux composition that is applied to the internal features of the condenser during assembly. The flux composition is specifically applied to a surface of the aluminum alloy header which is clad with the brazing alloy so as to promote the complete and consistent brazing of the internal tubes and components.

The method of this invention for assembly of a condenser includes the following steps. First, a pair of headers is stamped from an aluminum alloy brazing stock material clad on both sides with an appropriate aluminum-silicon brazing alloy. Each of the headers is formed to have a strip-like shape with a multitude of perforations.

Prior to further assembly of the condenser, an inventive feature of this invention is that a predetermined amount of the preferred brazing flux composition is deposited onto a surface of each header along both longitudinal edges of the stamped header and between each of the perforations. The predetermined amount of the brazing flux material is sufficient to deoxidize and wet substantially all of the surface of the header between each of the perforations during the subsequent brazing operation.

The tubes are then assembled into the headers. Each tube is inserted into a corresponding perforation in each header so that the tubes all extend in hydraulic parallel between the headers. The individual tubes and headers are then brazed together using a conventional brazing cycle employed with an aluminum-silicon brazing alloy.

The brazing flux composition of this invention is a paste-like mixture that consists of about 40 to about 60 weight percent potassium fluoaluminate particles dispersed in a liquid carrier. The particles are preferably a fine powder where typically 99.7 percent of which are 25 μm in diameter or smaller. The liquid carrier consists of from about 90 weight percent to 100 weight percent of a low molecular weight, water miscible polyhydric alcohol having two to four carbon atoms and up to about 10 weight percent water. Ethylene glycol and/or glycerin are suitable polyols. Propylene glycol is the preferred flux carrier. Such liquid carrier compositions result in a flux composition having a sufficiently high viscosity, e.g., of paste-like consistency, so as to permit its easy, consistent deposition on the header surface. In addition, the flux mixture is sufficiently viscous that it can be deposited onto the surface without worry that it will be displaced during subsequent assembly and processing. The principal function of the water is to adjust the viscosity for processing and deposition.

In addition, the condenser contains a vapor inlet and a condensate outlet, and tanks which provide reservoirs for the refrigerant within the condenser during operation of the air conditioning unit. The tanks are formed by brazing at least one of the spaced headers to at least one aluminum alloy extrusion, with appropriately located spacers between the tanks. Most likely, tanks will be formed in conjunction with each header. Preferably, the tanks and headers are assembled and brazed concurrently during the brazing operation employed to braze the internal tubes to the headers.

In the brazed assembly, each of the tubes are in fluidic communication with at least one of the tanks so that there is a continuous fluidic path from the vapor inlet to the condensate outlet through the tubes and tanks.

The method for assembly of this invention is particularly advantageous in that the relatively high viscosity flux composition (as compared to the prior aqueous suspensions) is not only easily deposited onto the surface of the header without concern for its removal during subsequent assembly, but also since the polyol portion of the flux composition significantly minimizes the addition of water, the flux composition does not contribute to additional moisture around the assembly during brazing which could detrimentally cause oxide build-up on the brazed surfaces, thereby hindering the formation of high quality brazed joints. Further, since the internal features of the assembly, particularly the internal surfaces of the headers, are clad with a brazing alloy and additionally deposited with the preferred flux composition, uniform brazed joints are formed between the internal tubes and headers, thereby significantly reducing the number of defective condenser assemblies due to leaky internal joints.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawing wherein.

DETAILED DESCRIPTION OF THE INVENTION

An improved method for assembly of a brazed automobile air conditioning condenser is provided which utilizes a novel, high viscosity flux composition that is applied to the internal features of the condenser during assembly so as to promote the complete and consistent brazing of the internal tubes and components.

Figure 1:
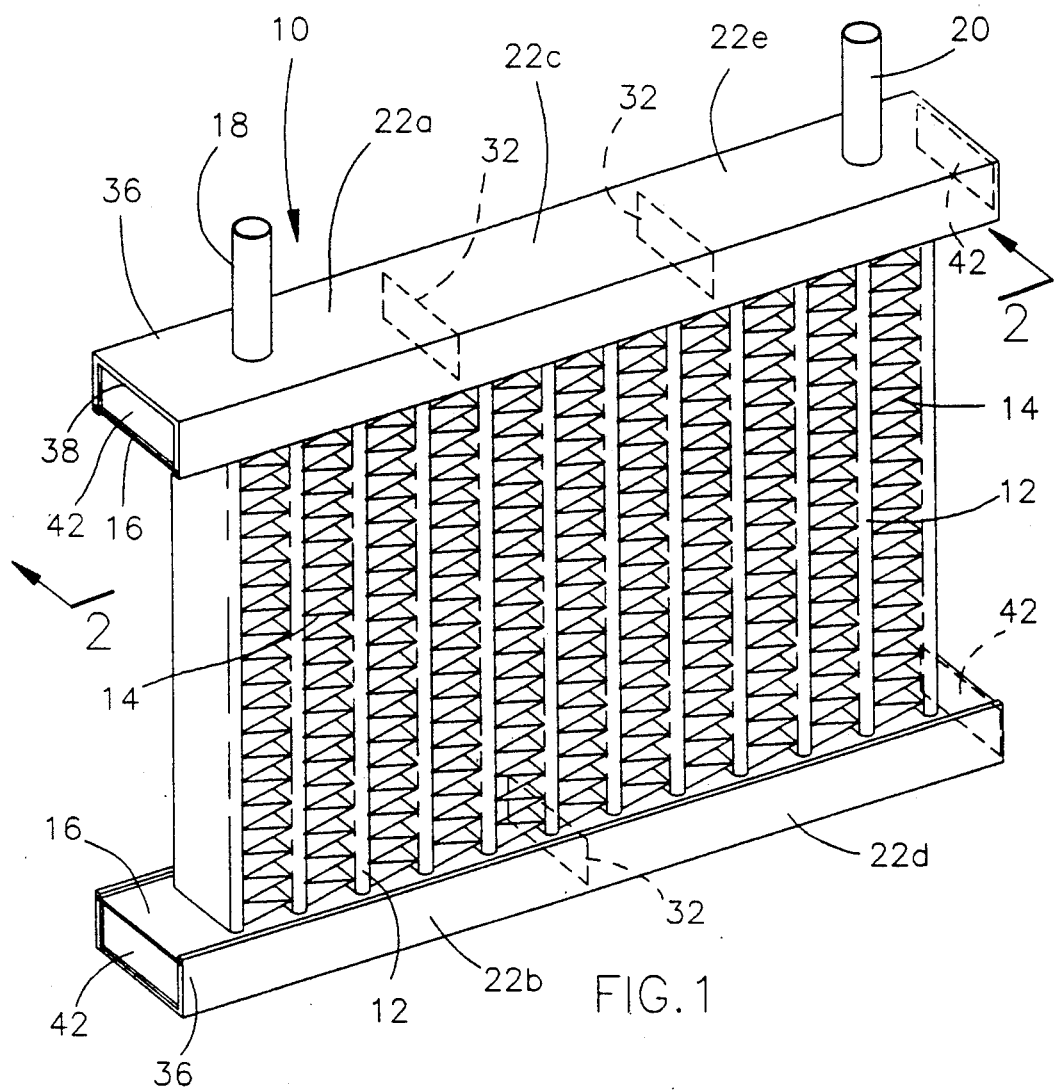
FIG. 1 illustrates a perspective view of a tube-and-center type condenser unit used routinely within automobile air conditioning systems which was formed in accordance with the assembly method of this invention.

Shown in FIG. 1 is a perspective view of a conventional tube-and-center type condenser unit 10 used routinely within automobile air conditioning systems which was formed in accordance with the improved assembly method of this invention. The tube-and-center design is preferred for these types of heat exchangers, i.e., the air conditioning condenser 10, because this particular design maximizes the amount of surface area that is in contact with the incoming air by flowing the air around the high surface area centered fins 14, for dissipation of heat from the refrigerant through the walls of the condenser tubes 12. As shown, a vapor inlet 18 and a condensate outlet 20 are provided in fluidic communication with reservoir tanks 22 so that there is a continuous fluidic path, albeit circuitous, from the vapor inlet 18 to the condensate outlet 20 through the tubes 12 and tanks 22.

Figure 2:
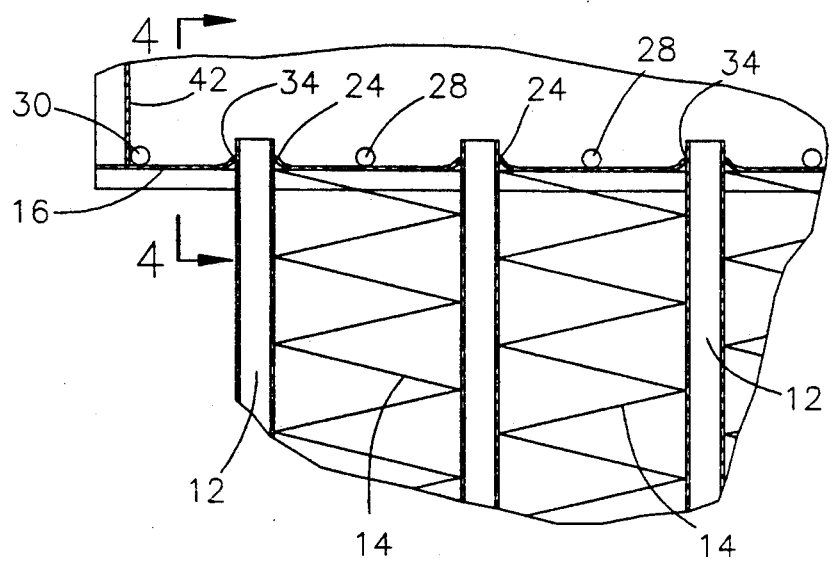
FIG. 2 is a cross-sectional view of a region of the header component showing inserted tubes and finned centers, as well as the preferred flux placement on the header component.

Shown more closely in FIG. 2 is an illustrative region of one of the headers 16 with a number of tubes 12 inserted within the perforations 24 of the header 16 and a number of finned centers 14 provided between the tubes 12. Each header 16 is stamped from an aluminum alloy brazing stock material consisting of an aluminum alloy core layer that is clad on both sides with an appropriate aluminum-silicon brazing alloy (not shown).

A preferred aluminum alloy core layer is aluminum alloy AA 3003, as designated by the Aluminum Association (AA), that has been clad on at least one side, but preferably both sides, with an aluminum-silicon brazing alloy, such as aluminum-silicon brazing alloy AA 4045. Generally speaking, aluminum alloy AA 3003 has performed satisfactorily over the years. The material is easily stamped for formation of the headers 16. In addition, there are no inherent brazing difficulties associated with the use of this particular alloy, and the structural integrity of the material during use is sufficient. Other similar aluminum alloys could also be employed.

Brazing alloy AA 4045 may be applied to the sheet of preferred core alloy in the form of wire, rod, sheet or powder. It would appear that the sheet form of the brazing alloy is most practical for cladding to the sheets of core alloy. Brazing alloy AA 4045 is characterized by a composition of about nine to eleven weight percent silicon and the balance aluminum. It is a eutectic brazing alloy and therefore melting is initiated at its eutectic temperature during the brazing operation which is less than the melting temperature of the core alloy. It is to be noted that although the preferred core alloys of this invention were clad with brazing alloy AA 4045, other suitable brazing alloys that are characterized by an appropriate melting range as described below could be substituted for the AA 4045. This would probably include other aluminum-silicon brazing alloys characterized by a silicon content of between about 6.8 and 14 weight percent silicon, as well as other eutectic, hypoeutectic or hypereutectic aluminum-silicon brazing alloys.

Once the preferred core alloy is clad with the two layers of brazing alloy, it is referred to as aluminum brazing stock material and is rolled using conventional techniques to an appropriate thickness. For formation of the headers 16, the aluminum brazing stock material is rolled to a thickness of about one to three millimeters. Depending on the particular application for the aluminum brazing stock material, the thickness may vary considerably. Each of the two clad layers of brazing alloy constitutes about five percent of the total thickness of the aluminum brazing stock material. Therefore, the total amount of brazing alloy within the aluminum brazing stock is about 10 percent. Accordingly, the thickness of the braze alloy applied to the core alloy during cladding (prior to the final rolling steps to the desired thickness) will depend upon the desired final ratio of the two materials. This ratio of braze alloy to core alloy in the total thickness of the aluminum brazing stock material will also vary depending on the particular application and whether both sides of the core alloy are clad, and therefore can be adjusted easily. In practice, each of the clad layers may range from a few percent up to about 15 percent of the total thickness of the brazing stock material.

Figure 3:
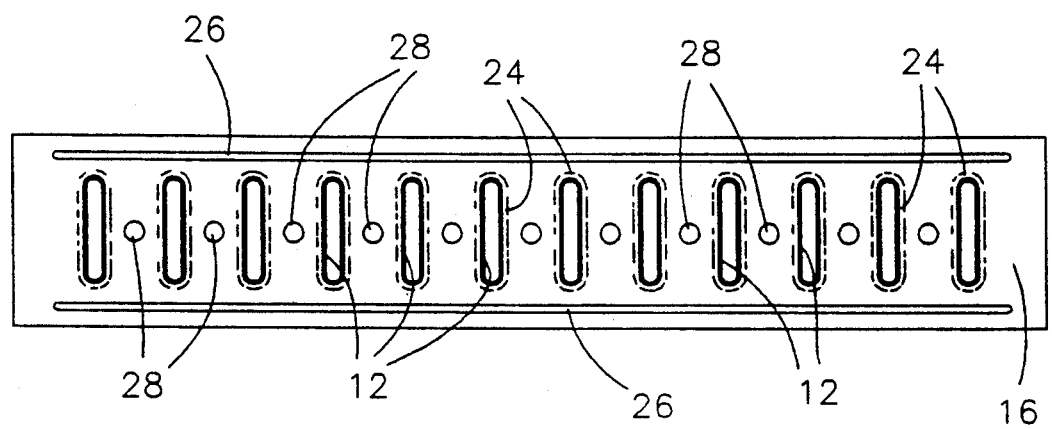
FIG. 3 is a top view of the header of FIG. 2 showing the preferred flux placement on the header component.

Each of the headers 16 is stamped and pierced to have a strip-like shape with a multitude of evenly spaced perforations 24, as shown most clearly in the top view of FIG. 3. Prior to further assembly of the condenser 10, an inventive feature of this invention is that a predetermined amount of the preferred brazing flux composition is deposited onto a surface of each header 16 along both longitudinal edges 26 of the stamped header 16 and between (represented by region 28) each of the evenly spaced perforations 24, as shown in FIGS. 2 and 3.

The preferred brazing flux composition consists of from about 40 to about 60 weight percent potassium fluoaluminate ($KAlF_4$) particles in a liquid carrier. Most preferably, the composition should contain from about 49 to about 51.5 weight percent of the particles. The conventional potassium fluoaluminate particles are typically employed with a water-based solvent when brazing these types of aluminum alloys. We prefer a fine powder in which substantially all of the particles are about 25 micrometers or less in largest dimension. This solid flux is preferred since it has proven reliability with aluminum-silicon alloys of the type employed in the condenser 10, and after brazing upon solidification it forms a noncorrosive, glassy, ceramic residue which does not impair the operation of the condenser 10.

The liquid carrier within the brazing flux composition consists of from about 90 to 100 weight percent of a water miscible, two to four carbon atom polyhydric alcohol and the balance water. Water is used to adjust viscosity for handling and depositing. A nominal composition for the most preferred composition, by weight, would be about 93 percent propylene glycol and the balance water. This mixture provides a suitable paste viscosity and is suitably nontoxic. A less preferred but suitable flux carrier mixture consists by weight of 13 percent glycerine, about 79 percent ethylene glycol and about 7 percent water. The three compounds when used in combination provide a desired viscosity level for the braze flux composition. The flux mixtures are white paste-like materials. It is desirable that the flux composition be sufficiently viscous so as to ensure that it remains positioned at the desired regions during assembly, yet it is also preferable for high volume production applications that the flux composition be capable of being deposited through an automatic dispensing orifice without plugging of the orifice.

An important feature of this invention is that the liquid carrier for the flux solids employs a minimum of water, while still providing a suitable carrier for the solids. As stated previously, a particular problem which occurs during brazing of these types of condensers 10 when using conventional aqueous-based flux compositions is that it is extremely difficult to remove all of the moisture from within and around the condenser 10 before brazing. The presence of the moisture impedes the brazing action. In practice, it is not uncommon for the condenser 10 to contain entrapped moisture and free oxygen above a dewpoint of about $-45°$ F. and a free oxygen level of greater than 100 ppm, even though the exterior of the condenser 10 is exposed to a controlled atmosphere below these parameters. Accordingly, the quality of the interior joints 34 is less than satisfactory.

With the braze flux composition of this invention, the highly concentrated flux is deposited in proximity to the internal joints 34 in an amount sufficient to deoxidize the aluminum so as to enable excellent braze fillet formation. It should be noted that even though some oxidation of the braze flux composition will most likely occur since the composition is deposited onto the desired regions during assembly which may not be immediately prior to the actual brazing operation, the amount of the braze flux composition is sufficient to perform satisfactorily during the brazing operation.

In practice, with the clad header 16 as described above, about 0.3 to about 0.4 grams of the braze flux composition is deposited along each longitudinal edge 26 of the stamped header 16 and about 0.02 to about 0.04 grams are deposited between each of the evenly spaced perforations 24 (represented by region 28), as shown in FIGS. 2 and 3. These amounts may vary considerably depending on the size of the condenser unit 10 and its components and the amount of brazing alloy to the core aluminum alloy layer of the header 16.

An advantageous feature of this invention is that the polyhydric alcohol vehicle of the braze flux composition burns off cleanly during the brazing operation, therefore not hindering its flux or brazing action.

This braze flux composition is essentially a paste consistency and characterized by a sufficiently high viscosity so as to permit its easy, consistent deposition on the header 16 surfaces, without undue concern that it will be displaced during subsequent assembly and processing of the condenser 10. The preferred viscosity of the braze flux composition, when tested using standard Zahn viscosity measurements, ranges from about 17 seconds to 21 seconds with a standard number four Zahn cup measurement and from about 23.5 seconds to about 29 seconds with a standard number three Zahn cup measurement. This preferred range of viscosities ensures uniform deposition and adherence during subsequent assembly, while also facilitating the high volume deposition of the composition using automatic dispensing equipment.

A sufficient amount of the braze flux material is deposited onto the surface (26 and 28) of the header 16 so as to deoxidize and wet substantially all of the surface of the header 16 at each perforation 24 for formation of the brazed joints. As shown in FIG. 2, the brazing flux material is deposited onto the internal surface of the header 16, which is the surface oppositely disposed from the tubes 12 extending in hydraulic parallel. Presumably, the brazing flux material could be deposited onto this opposite surface as well; however, it is not necessary for obtaining good brazing results. The flux paste is deposited automatically onto the header 16 surface 28 between each perforation 24. In addition, as shown most clearly in FIG. 3, the flux paste is also deposited proximate to the edges 26 of the internal surface of the header 16. Also, again as shown in FIG. 2, predetermined amounts of the flux paste are provided adjacent 30 to those regions where the header 16 will be brazed to a perpendicular separator 32 for formation of one of the reservoir tanks 22. Approximately the same or greater amount of flux paste is deposited at these regions 30 as is deposited between (28) each perforation 24, but again the exact amount will vary greatly depending on the application.

By predepositing the braze flux material in these specific regions 26, 28 and 30, the flux is in a most efficient position to work with the internal braze alloy cladding of the header 16 to form high quality brazed joints. During the brazing cycle, the flux removes the oxide ordinarily present on the exposed aluminum surfaces and including the brazing alloy surfaces, particularly at the locality of the internal joint 34. The flux also promotes flow of the molten brazing alloy during the heating step and inhibits further oxide formation. The flux must be capable of dissolving and removing the aluminum oxides at the brazing temperatures while remaining essentially inert with respect to aluminum at such temperatures. Since fluxes are reactive to remove the oxide only when at least practically molten, the flux must be partly or wholly molten at the brazing temperatures. The preferred potassium fluoaluminate flux composition meets these requirements.

After deposition of the brazing flux paste, as shown in FIGS. 2 and 3, the tubes 12 are then assembled to the headers 16. Each tube 12 is inserted into a corresponding perforation 24 in each header 16, so that the tubes 12 all extend in hydraulic parallel between the headers 16, shown most clearly in FIG. 1. Although at this point the individual tubes 12 and headers 16 could be brazed together, with assembly of the remaining components, i.e., the tanks 22 and inlet 18 and outlet 20, being performed subsequently, it is preferred that all brazing be done concurrently. Therefore, it is preferred that the tanks 22 and inlet 18 and outlet 20 are also assembled before brazing, although not necessary.

Figure 4:
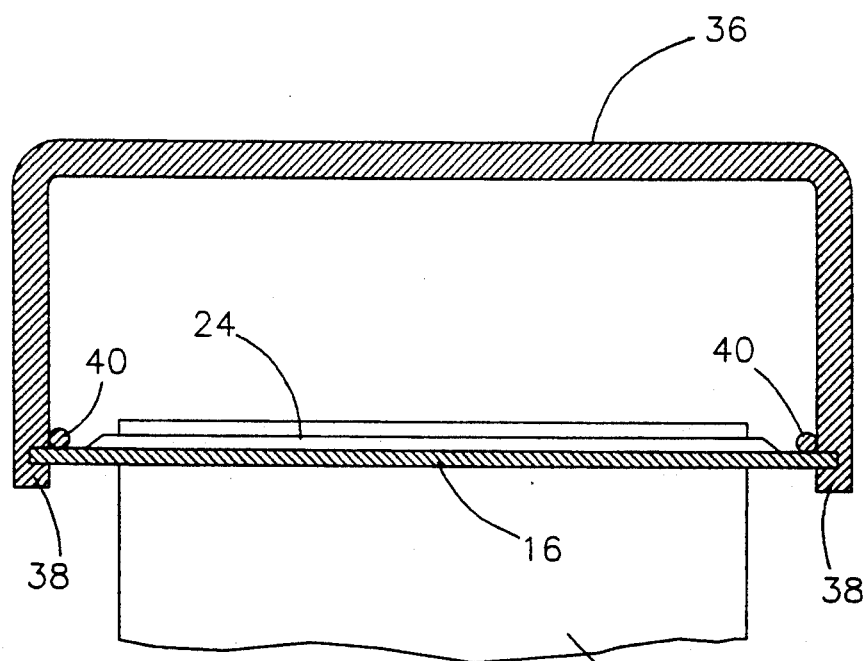
FIG. 4 is a cross-sectional view showing the assembly of the header and extruded tank pieces with the preferred flux placement.

Shown cross-sectionally in FIG. 4 is an assembled tank 22 formed by clinching an end 38 of an extruded tank portion 36 around the header 16. The extruded tank portion 36 is formed from a compatible aluminum alloy such as AA 3003. The extruded tank portion 36 is permanently secured to the header 16 not only by means of clinching the end 38 around the header 16, but also by brazing, as represented by the preferred placement 40 of the braze flux paste of this invention. For formation of the tanks 22, various separators 32 and end plates 42 are required, as most clearly seen in FIG. 1. The separators 32 and end plates 42 are also formed from the double clad aluminum alloy brazing stock, preferred for formation of the headers 16, thereby promoting the formation of high quality braze joints between components. Also as stated previously with reference to FIG. 2, the flux paste of this invention is deposited adjacent to the separator 32 or end plate 42 to facilitate high quality brazing. The tanks 22 provide reservoirs for the refrigerant within the condenser 10 during operation of the air conditioning unit.

The condenser 10 further contains a vapor inlet 18 and a condensate outlet 20. These components are appropriately fixtured and brazed, or alternatively are assembled to the condenser 10 after the brazing operation by methods such as welding. In the finished assembly, each of the tubes 12 are in fluidic communication with at least one of the tanks 22, so that there is a continuous fluidic path from the vapor inlet 18 to the condensate outlet 20 through the tubes 12 and tanks 22.

It is to be noted that prior to the actual brazing operation, it is preferred that the assembled condenser 10 be further treated with a flux composition on its external surfaces, so as to facilitate the brazing of any external joints. This external application of the braze flux may be performed in accordance with conventional teachings. For example, the condenser 10 may be sprayed with a flux solution consisting of about 20 volume percent potassium fluoaluminate solids in water. An additional 0.5 volume percent of a suitable surfactant or wetting agent may be added to the flux solution to enhance the adherence of the potassium fluoaluminate solids to the external surfaces of the condenser 10. If this approach is employed for fluxing the external surfaces, then the condenser 10 should preferably be dried before brazing so as to evaporate any water from the condenser 10 surfaces.

The condenser 10 is then brazed in a controlled atmosphere brazing furnace. The drying oven portion of this furnace heats the assembly 10 to about 700° F. over a period of a few minutes to drive off the liquids so as to leave a dry flux residue. During the brazing operation, the dewpoint of the atmosphere is maintained below about −40° F. and the free oxygen level is maintained below about 100 ppm. Next, the condenser 10 is heated to about 1070° F. to 1135° F., preferably about 1120° F., whereupon the clad braze layers liquefy and fill the joints in the assembly producing a leak-free condenser 10. After a few more minutes, such as about three to six minutes, at peak temperature, the condenser 10 is cooled to about 950° F. for a minute or two to allow for equilibration of the brazed joints and then cooled very rapidly to room temperature.

The particular thermal cycle used for brazing of the condenser 10 will depend on the particular brazing alloy which is clad to the core aluminum alloy. With the clad brazing alloy AA 4045, the optimal range of brazing temperatures is between about 1070° F. to about 1135° F. so as to ensure complete melting of the eutectic brazing alloy, since the approximate melting point of alloy AA 4045 is about 1070° F. to about 1110° F. The melting temperature of the preferred core aluminum alloy, AA 3003, is approximately about 1190° F., which is sufficiently higher than the optimal brazing range.

Therefore, at exposure to the brazing temperature, the flux composition will deoxidize the surface of the aluminum brazing alloy and the exposed aluminum core alloy at the faying surfaces, and then the brazing alloy will be drawn by capillary action towards the seams at the desired braze joints and upon cooling will solidify to form the desired braze bond. The result is a leak-free joint between components. As stated previously, other brazing alloys could be used, so long as they are characterized by a melting temperature of less than about 1190° F., which is approximately the melting temperature of the core aluminum alloy that provides the structural component of the material.

Brazing preferably occurs in a controlled atmosphere furnace so as to reduce or eliminate the formation of a detrimental oxide layer and to facilitate the concurrent brazing of the multitude of brazed joints within the condenser 10, which may not be possible with other forms of brazing, such as dip brazing or wire brazing techniques. However, although controlled atmosphere furnace brazing is highly preferred as the method for forming these condensers 10 because of these practical concerns, other alternative methods for brazing may be utilized.

The condensers 10 manufactured in accordance with this invention were brazed successfully and did not show evidence of irregularities or discontinuities around the braze fillets. The incidence of leaking condensers 10 after brazing was significantly less than when using conventional flux application and brazing techniques. The rate of rejection for these condensers 10 due to leakage is less than about 0.5 percent when using the assembly techniques of this invention, as compared to a leakage rate of about 10 to 30 percent with conventional assembly methods.

A particularly advantageous feature of this invention is that the high viscosity flux composition is not only easily deposited onto the surface of the header without concern for its removal during subsequent assembly, but also since the solvent portion of the flux composition significantly minimizes the addition of water, the flux composition does not contribute to additional moisture in and around the assembly during brazing, which could detrimentally cause oxide build-up on the brazed surfaces, thereby hindering the formation of high quality brazed joints. This eliminates the need for internal flux flushing or nitrogen purging prior to brazing.

In addition, the noncorrosive flux composition is easily deposited at the desired regions of the condenser 10. Also, the liquid carrier for the flux solids within the flux composition burns off readily during brazing, thereby facilitating, rather than hindering, the brazing operation.

Further, since the internal features of the assembly, particularly the internal surfaces of the headers 16, are clad with a brazing alloy and additionally deposited with the preferred flux composition, uniform brazed joints 34 are formed between the internal tubes 12 and headers 16, thereby significantly reducing the number of defective condenser 10 assemblies due to leaky internal joints 34.

Therefore, while our invention has been described in terms of a preferred embodiment, it is apparent that other forms could be adopted by one skilled in the art, such as by modifying the preferred flux composition within the preferred ranges, or by cladding the core aluminum alloy with a substitute braze alloy, or by modifying the processing steps or condenser design employed. Accordingly, the scope of our invention is to be limited only by the following claims.

The embodiments of the invention in which an exclusive property or privilege is claimed are defined as follows:

1. A method for assembly of a condenser suitable for use in an automotive air conditioner or other refrigeration unit, comprising:

providing a pair of spaced headers formed from an aluminum alloy brazing stock material wherein said aluminum alloy brazing stock material comprises an aluminum alloy core layer clad on at least a first surface with an aluminum-silicon brazing alloy, each of said spaced headers having a corresponding plurality of perforations;

depositing a braze flux on at least said first surface of each of said headers, said braze flux being deposited between each of said plurality of perforations in an amount sufficient to deoxidize and wet a region adjacent said perforations during a subsequent brazing operation, said braze flux comprising about 40 to about 60 weight percent potassium fluoaluminate particles dispersed in a liquid carrier, said liquid carrier consisting essentially of, by weight, from about 90 percent to 100 percent of a water miscible polyhydric alcohol of two to four carbon atoms and up to about 10 percent water;

inserting a tube into each of said corresponding perforations within each of said headers so as to extend in hydraulic parallel between said headers, such that each of said first surfaces of said headers having said braze flux are oppositely disposed across said extended plurality of tubes; and brazing said plurality of tubes within said perforations of said headers by sufficiently heating said aluminum-silicon brazing alloy and said braze flux such that said braze flux deoxidizes said aluminum alloy core layer and said aluminum-silicon brazing alloy at said perforations while also enhancing the flowability of said aluminum-silicon brazing alloy, thereby being effective to form leak-proof brazed joints at said perforations so as to produce a leak-proof condenser suitable for use in a refrigeration system.

2. A method for assembly of a condenser as recited in claim 1 wherein said aluminum-silicon brazing alloy employed for formation of said headers is characterized by an aluminum-silicon brazing alloy having a silicon content of about 6.8 to about 14 weight percent.

3. A method for assembly of a condenser as recited in claim 1 wherein said brazing step occurs at a temperature of about 1070° F. to about 1135° F.

4. A method for assembly of a condenser as recited in claim 1 further comprising the step, prior to said brazing step, of inserting high surface area, finned portions between each of said tubes.

5. A method for assembly of a condenser as recited in claim 1 further comprising the steps of attaching each of said spaced headers to a corresponding extruded aluminum alloy tank means so as to form a plurality of tanks and attaching a vapor inlet and a condensate outlet such that each of said tubes is in fluidic communication with at least one of said tanks so as to provide a continuous fluidic path from said vapor inlet to said condensate outlet through said plurality of tubes and said plurality of tanks.

6. A method for assembly of a condenser suitable for use in an automotive air conditioner or other refrigeration unit, comprising:

providing a pair of spaced headers formed from an aluminum alloy brazing stock material wherein said aluminum alloy brazing stock material comprises an aluminum alloy core layer clad on both surfaces with an aluminum-silicon brazing alloy characterized by about 6.8 to about 14 weight percent silicon, each of said spaced headers having a corresponding plurality of perforations;

depositing a braze flux paste onto at least a first surface of each of said headers, said braze flux being deposited between each of said plurality of perforations in an amount sufficient to deoxidize and wet a region adjacent said perforations during a subsequent brazing operation, said braze flux paste comprising about 40 to about 60 weight percent potassium fluoaluminate particles dispersed in a liquid carrier, said liquid carrier consisting essentially of, by weight, from about 90 percent to 100 percent of propylene glycol and up to about 10 percent water;

inserting a tube into each of said corresponding perforations within each of said headers so as to extend in hydraulic parallel between said headers, such that each of said first surfaces of said headers having said braze flux is oppositely disposed across said extended plurality of tubes;

inserting high surface area, finned portions between each of said tubes; and brazing said plurality of tubes within said perforations of said headers by heating to a temperature of about 1070° F. to about 1135° F. for a duration sufficient to melt said aluminum-silicon brazing alloy and said braze flux such that said braze flux deoxidizes said aluminum alloy core layer and said aluminum-silicon brazing alloy at said perforations while also enhancing the flowability of said aluminum-silicon brazing alloy, thereby being effective to form leak-proof brazed joints at said perforations so as to produce a leak-proof condenser suitable for use in a refrigeration system.

7. A method for assembly of a condenser as recited in claim 6 further comprising the steps of attaching each of said spaced headers to a corresponding extruded aluminum alloy tank means so as to form a plurality of tanks and attaching a vapor inlet and a condensate outlet such that each of said tubes is in fluidic communication with at least one of said tanks so as to provide a continuous fluidic path from said vapor inlet to said condensate outlet through said plurality of tubes and said plurality of tanks.

* * * * *